June 16, 1936.  L. M. MANLEY ET AL  2,044,481
MATERIAL WORKING MACHINE
Filed Dec. 8, 1934
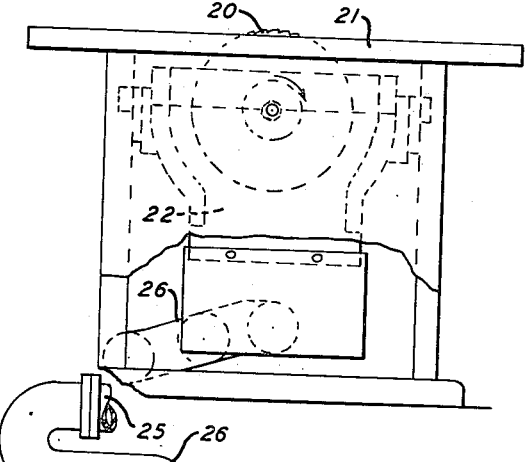
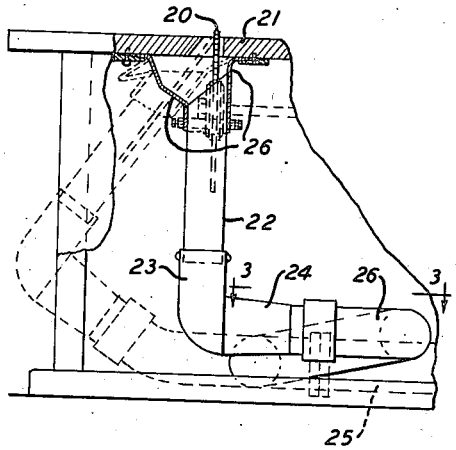
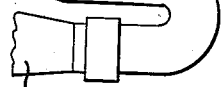
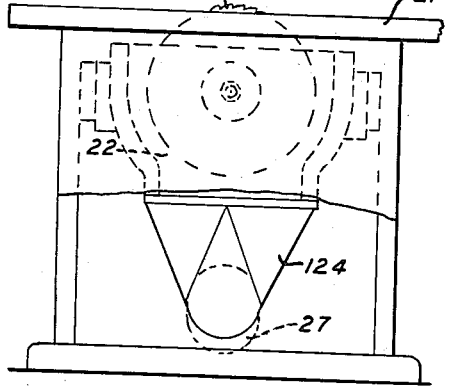
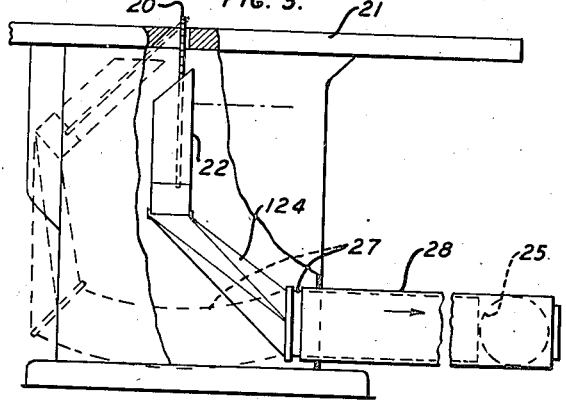
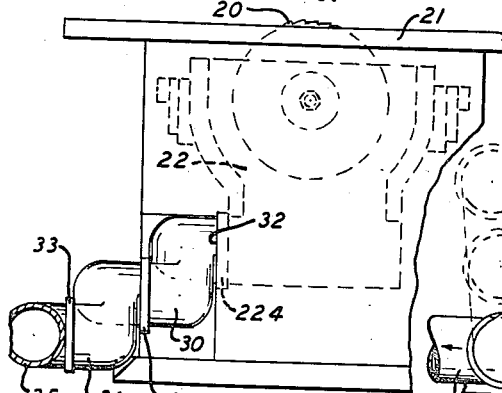
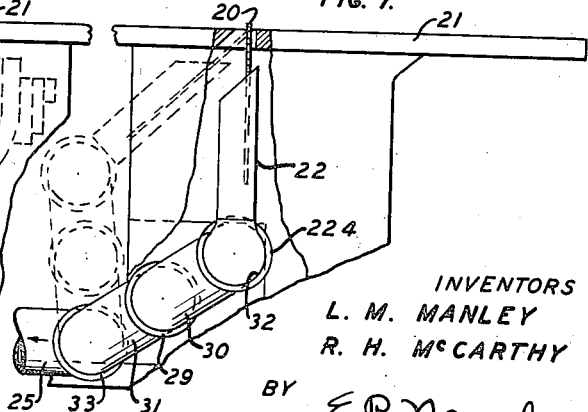
INVENTORS
L. M. MANLEY
R. H. McCARTHY
BY E. R. Nowlan
ATTORNEY Patented June 16, 1936

2,044,481

UNITED STATES PATENT OFFICE 2,044,481

MATERIAL WORKING MACHINE

Lloyd M. Manley, Forest Hills, and Rollin H. McCarthy, Manhasset, N. Y., assignors to Western Electric Company, Incorporated, New York, N. Y., a corporation of New York Application December 8, 1934, Serial No. 756,588

2 Claims. (Cl. 144—252)

This invention relates to material working machines and more particularly to material working machines having dust or chip removing devices associated therewith or incorporated in the structure thereof.

There are many machines used in wood working, metal working and analogous arts which remove material from a piece of work in the form of dust, chips and other fragments, machines such as grinders, sanders, saws and the like. The refuse from the operation of these machines may accumulate at the working point and interfere with operation, and may also be dangerous to health.

One object of the present invention is to provide a machine having means for adjusting a cutting or abrading or other analogous tool to more than one position with means to remove refuse from the working point which will be adjustable with the tool and hence efficient in all positions of the tool.

One embodiment of the invention contemplates a tool such as a circular saw, in which the saw is adjustable to be oriented at various angles to a work supporting table and which has a suction duct to remove sawdust, having a hood or casing surrounding the saw and adjustable therewith and having connecting means interposed between the casing and the duct which follows the motion of the casing and maintains the connection between the casing and the duct without necessitating any motion of the duct, the connecting means being flexible and/or telescopic in nature.

The above and other objects and features of the invention will appear from the following detailed description of several closely related embodiments thereof taken in connection with the accompanying drawing in which the same reference numerals are applied to identical parts in the several figures and in which Fig. 1 is a broken view in side elevation of a circular saw and its table provided with one form of dust duct connection constructed in accordance with the invention;

Fig. 2 is a broken view in left hand end elevation thereof;

Fig. 3 is a detached broken plan view of the connection;

Fig. 4 is a view similar to Fig. 1 of another form;

Fig. 5 is a view thereof similar to Fig. 2;

Fig. 6 is a view similar to Fig. 1 of a third form, and

Fig. 7 is a view thereof similar to Fig. 2.

In the embodiment of the invention disclosed herein, there is a circular saw 20 and a slotted saw table 21 therefor both of well known construction, the saw being driven by any appropriate means which is not shown as being irrelevant to the present invention and to save confusion. The saw is adjustable as indicated in Figs. 2, 5 and 7 from a vertical position to one at 45° to the table. Various means for this adjustment are well known and are also omitted here for simplicity of presentation, being irrelevant to the invention.

A casing or hood 22 surrounds the greater portion of the saw below the table and serves to catch sawdust from the saw. This casing is mounted to swing with the saw and to maintain a constant position relative thereto. The bottom of the casing is closed by a member 23 having an integral outlet.

In Figs. 2 and 3 the outlet 24 is a tapered tube. In Fig. 5 the outlet is an adapter 124 having at its upper end a rectangular cross section to fit the lower end of the hood and at its lower end a circular cross section. In Fig. 7 the outlet 224 is merely a circular pipe connection formed integrally in the bottom end wall of the hood.

A fixedly positioned suction duct 25 is located beside the machine but ordinarily not a part thereof. Hence only the open end of the duct is shown.

Turning now more particularly to the embodiment shown in Figs. 1, 2 and 3 connection is made between the outlet 24 and the suction duct 25 by means of a flexible pressure resisting tube 26 coupled to both. This tube is preferably of fabric and rubber with a helical metal spring reinforcement within to prevent collapse of the tube when the suction is on. Such tubes, hose or pipes are well known and no description here in further detail is thought necessary. The tube 26 is long enough to reach from outlet 24 to duct 25 in all relative positions thereof and hangs loosely therebetween or lies loosely on the floor or other support with freedom to accommodate itself to all motions of the outlet 24.

A boot 26 of flexible material may preferably be used to seal the variable gap between the top of the casing 22 and the under side of the table, and although shown only in Fig. 2 may be advantageously applied also in the construction of Figs. 5 and 7.

In the embodiment of Figs. 4 and 5, a length 27 of flexible tubing, preferably of the well known metallic type in which two channel shaped strips of metal are helically wound and interlocked with each other, is secured at one end thereof to the outlet 124 of the hood and slides telescopically longitudinally within a corresponding fixed sleeve or tube 28 connected to the end of the duct 25. Thus as the hood swings the tube 27 slides in and out of the tube 28 and being flexible accommodates itself to the arcuate path of the outlet 124.

Figs. 6 and 7 disclose a third mode of embodiment in which a flexible and extensible connection between the hood outlet 224 and the duct 25 is made by means of a "gas fixture" connection comprising two Z-shaped tubes 30 and 31 pivotally joined together at 29 and pivotally connected to the outlet 224 and to the duct 25 at 32 and 33 respectively.

In any one of the three modifications shown, the invention permits the casing outlet 24, 124 or 224 as the case may be to alter its direction and/or distance from the end of the duct 25 without disrupting the connection therebetween, thereby improving the efficiency of the refuse removal.

While here disclosed as applied to a tiltable circular saw, the invention is evidently equally applicable to any analogous machine where an exhaust hood is associated with a displaceable tool which produces dust or other refuse, to remove the refuse by suction through the movable hood into a stationary duct, and in which the direction and/or distance of the hood from the duct is altered.

The embodiments herein disclosed are illustrative merely and may be widely departed from or modified without departing from the scope and spirit of the invention as pointed out in and limited solely by the appended claims.

What is claimed is:

1. In a machine having a displaceable tool and an exhaust casing associated and movable with the tool, refuse removing means comprising a fixed suction member and a flexible hollow connection means interposed between and connected to both the casing and the suction member whereby the casing may move relatively to the suction member to change its direction and distance therefrom while remaining connected thereto, the said connection means comprising two pivotally interconnected hollow Z-shaped members connected at the outer ends respectively to the casing and to the suction member, the combined length of the Z-shaped members being greater than the least distance between the casing and the suction member.

2. In a machine having a swingingly displaceable tool movable in an arcuate path, refuse removing means comprising an exhaust casing associated with and moving in an arcuate path with the tool, a fixed suction member, a duct member pivotally secured to the fixed suction member, and a duct member pivotally interconnected therewith and pivotally secured to the casing and movable at one end in an arcuate path with the casing.

LLOYD M. MANLEY.
ROLLIN H. McCARTHY.